(12) United States Patent
Long et al.

(10) Patent No.: US 7,350,423 B2
(45) Date of Patent: Apr. 1, 2008

(54) REAL TIME USAGE MONITOR AND METHOD FOR DETECTING ENTRAPPED AIR

(75) Inventors: David C. Long, Wappingers Falls, NY (US); Jason S. Miller, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 10/707,812

(22) Filed: Jan. 14, 2004

(65) Prior Publication Data

US 2005/0150901 A1 Jul. 14, 2005

(51) Int. Cl.
*G01F 1/38* (2006.01)
(52) U.S. Cl. .................................. 73/861.47
(58) Field of Classification Search .............. 73/1.19, 73/1.21, 1.23, 239, 861.47
See application file for complete search history.

(56) References Cited

U.S. PATENT DOCUMENTS

| | | | | |
|---|---|---|---|---|
| 3,756,456 | A | * | 9/1973 | Georgi .......................... 222/1 |
| RE29,495 | E | * | 12/1977 | Georgi .......................... 222/1 |
| 4,475,666 | A | * | 10/1984 | Bilbrey et al. ................. 222/14 |
| 4,478,775 | A | * | 10/1984 | Endo et al. .................. 264/40.3 |
| 4,543,649 | A | * | 9/1985 | Head et al. .................... 367/96 |
| 4,662,540 | A | | 5/1987 | Schroter |
| 4,700,870 | A | | 10/1987 | Schleicher et al. |
| 4,781,066 | A | * | 11/1988 | Pope et al. .................... 73/239 |
| 4,938,054 | A | * | 7/1990 | Dye et al. ..................... 73/1.21 |
| 5,054,650 | A | * | 10/1991 | Price ............................. 222/1 |
| 5,182,938 | A | | 2/1993 | Merkel |
| 5,526,674 | A | * | 6/1996 | Korpi .......................... 73/1.21 |
| 5,921,437 | A | * | 7/1999 | Takachi ....................... 222/63 |
| 6,254,832 | B1 | * | 7/2001 | Rainin et al. ............... 422/100 |
| RE37,553 | E | | 2/2002 | Ciavarini |
| 6,565,333 | B2 | * | 5/2003 | Maruyama .................. 417/417 |
| 6,722,261 | B1 | * | 4/2004 | Brown et al. ................. 92/5 R |
| 6,742,993 | B2 | * | 6/2004 | Savard et al. ................ 417/53 |
| 6,817,252 | B2 | * | 11/2004 | Wiklund et al. ......... 73/861.44 |
| 6,848,323 | B2 | * | 2/2005 | Krouth et al. ........... 73/861.47 |
| 6,973,936 | B2 | * | 12/2005 | Watson .......................... 137/1 |

FOREIGN PATENT DOCUMENTS

DE 4130295 A1 * 3/1993

* cited by examiner

*Primary Examiner*—Hezron Williams
*Assistant Examiner*—John Fitzgerald
(74) *Attorney, Agent, or Firm*—Wenjie Li; Ira D. Blecker

(57) ABSTRACT

A dispensing system for feeding paste through a screen onto a workpiece monitors the position of a piston applying pressure to the paste with a linear variable differential transformer and sets limits on the slope of the piston displacement is a measure of the feed rate and the "spring back" of the piston when pressure is released, as a measure of trapped air in the system.

17 Claims, 4 Drawing Sheets

REAL TIME USAGE MONITOR AND METHOD FOR DETECTING ENTRAPPED AIR

BACKGROUND OF INVENTION

The field of the invention is that of machines for dispensing a paste onto a workpiece.

In metal stencil mask printing processes, paste is extruded through a stencil mask by means of an extrusion nozzle in contact with the mask. This extrusion is accomplished through the use of a pneumatic piston applying pressure to a sliding plunger within the paste reservoir chamber.

Typically, the mask has the same width as the workpiece, such as a printed circuit board, a ceramic chip carrier for holding integrated circuits, etc. The nozzle travels across the mask, dispensing a thick paste that passes through the mask according to the pattern on the mask and is deposited on the workpiece.

As the nozzle traverses the surface of the mask, the plunger moves down and paste is dispensed through the nozzle. The paste is extruded through the metal mask onto the ceramic greensheet, in the case of chip carriers, filling through vias and printing metallized lines.

In this process, there are a number of conditions that can lead to screening problems:

a) Entrapped air bubbles in the paste causing random screening defects (line voids);

b) Nozzle and screener variability causing paste dispense rate variation that can result in yield losses and process control difficulties;

c) Interior reservoir wall defects, piston defects, and air cylinder misalignment/defects that can create binding or "hiccups" (stiction/friction) in plunger displacement; and d) Screener or nozzle malfunctions can lead to gross paste overusage.

Presently, there is no good method for detecting any of the above problem conditions:

a) Entrapped air bubbles go largely unnoticed during the screening process. The entrapped bubbles can lead to small screening defects that are not detected until pattern inspection;

b) Paste dispense rate variation is currently undetectable in screening. This problem increases the variability of the manufacturing process, lowering overall product yields;

c) Stiction/friction and binding problems are only detectable through manual inspection of reservoir walls, piston, and air cylinder and their linkages and alignment; and d) Gross paste overusage is usually not recognized until an entire paste reservoir has been wasted on just a handful of sheets (normal paste usage results in 50 60 sheets per reservoir).

Various mechanisms are known in the field of dispensing liquids. For example, U.S. Pat. No. 4,662,540 illustrates a pressure sensor that sends a signal representative of the pressure in the fluid reservoir to electronics that sound alarms when various undesirable situations occur. As one instance, the electronics sounds an alarm when the pressure exceeds a desired higher or lower limit.

Bubbles are detected by a rate of change in pressure that exceeds a limit.

The foregoing approach implicitly assumes that the cross section of the dispensing system is constant.

In the field of paste dispensing, through a mask, the cross section of the pattern is a variable and therefore the "impedance" of the system will also vary.

In addition, the paste reservoirs are not constant in time, but change as different batches are made up from clean component parts and put into the line.

Furthermore, the use of pressure sensors is not practical in this instance because of the difficulty in properly mounting them in communication with the paste and the difficulty in cleaning them and protecting them from malfunction due to dried paste.

Thus, the field of paste dispensing has not had available a satisfactory monitoring system.

SUMMARY OF INVENTION

The invention relates to a system for monitoring the dispensing of paste from a reservoir.

A feature of the invention is that the parameter sensed is the volume of paste remaining in the reservoir.

Another feature of the invention is that the pressure applied to the paste is removed in order to detect entrapped air.

Another feature of the invention is that the slope of the piston position versus the screening stroke (linear with time) measures the rate of dispensing paste.

DETAILED DESCRIPTION

The present invention provides a mechanism for real-time detection of all of the conditions described above. Additionally, it serves as a valuable tool for diagnosing the root cause of problems responsible for screening malfunctions.

Figure 3:
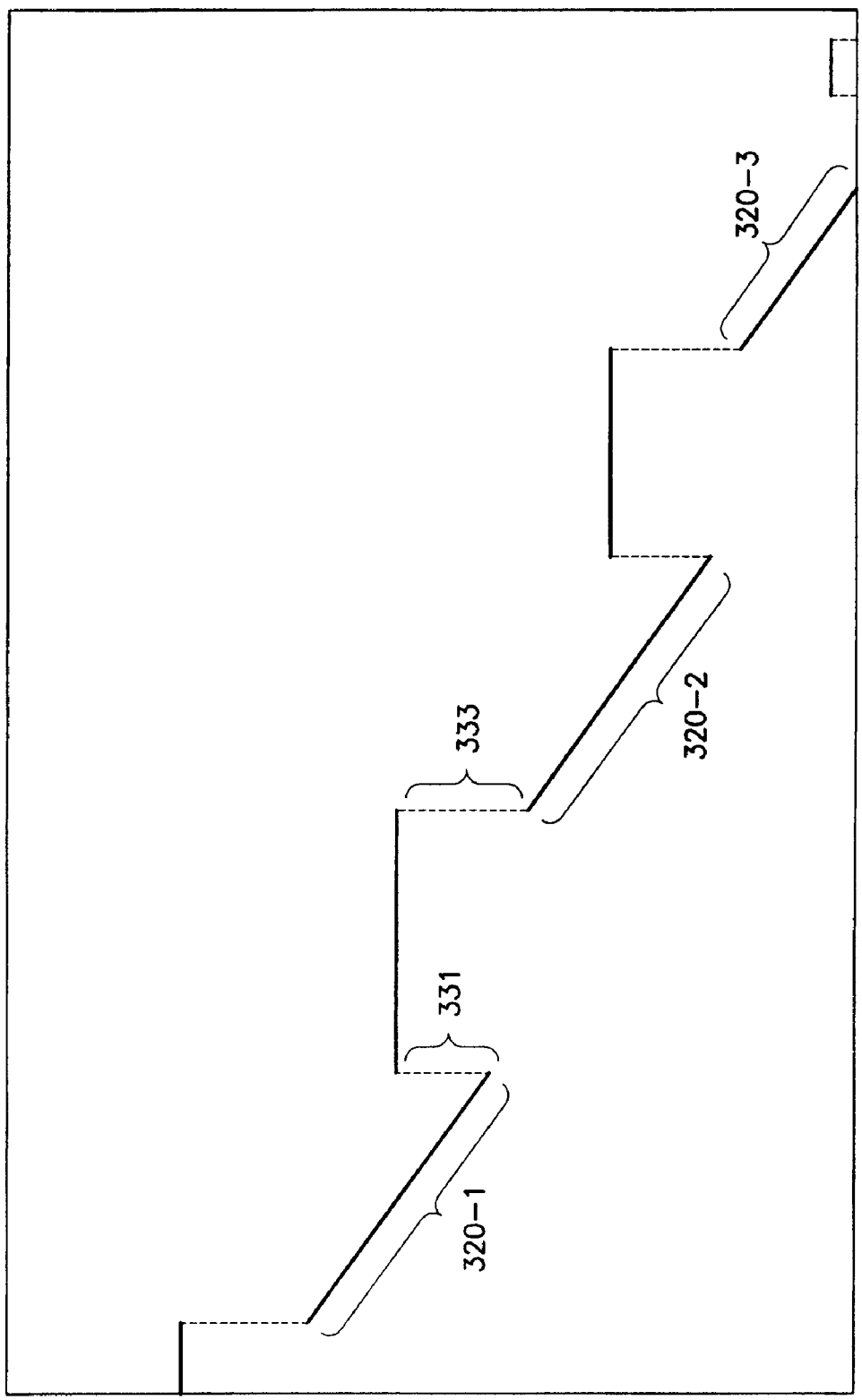
FIG. 3 shows the output of the sensor during a paste application process.
Figure 4:
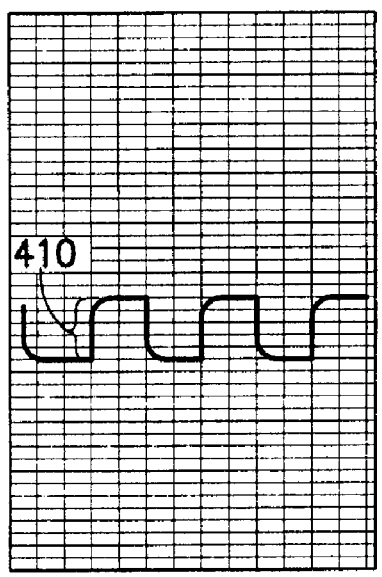
FIG. 4 shows the output of the sensor during a test with a closed nozzle one quarter full.
Figure 5:
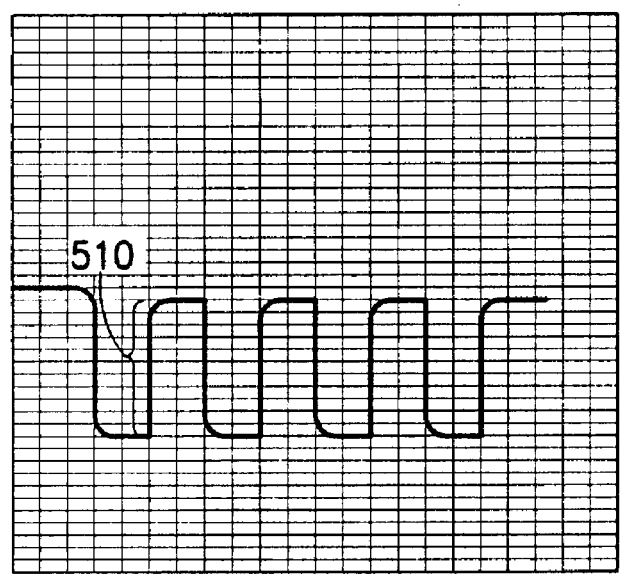
FIG. 5 shows the output of the sensor during a test with a closed nozzle one half full.

All of the above mentioned problems can be readily identified with the use of this device:

a) Entrapped air bubbles can be quickly identified and quantified by the amount of "spring back" of the nozzle plunger when the piston force is removed (as shown in FIGS. 3, 4 & 5 below).

b) Specifications can be placed on the paste dispense rate, both for too high and too low a dispense rate. Any nozzles or screeners that violate the specifications can be identified and corrected.

c) Any "hiccups" or non-linearities in paste dispense rate can be identified and corrected.

d) Conditions that would normally lead to gross paste overusage can be identified and corrected in the first screening pass, avoiding the "dumping" of an entire paste reservoir and the resultant loss of both paste and manufacturing throughput.

Figure 1:
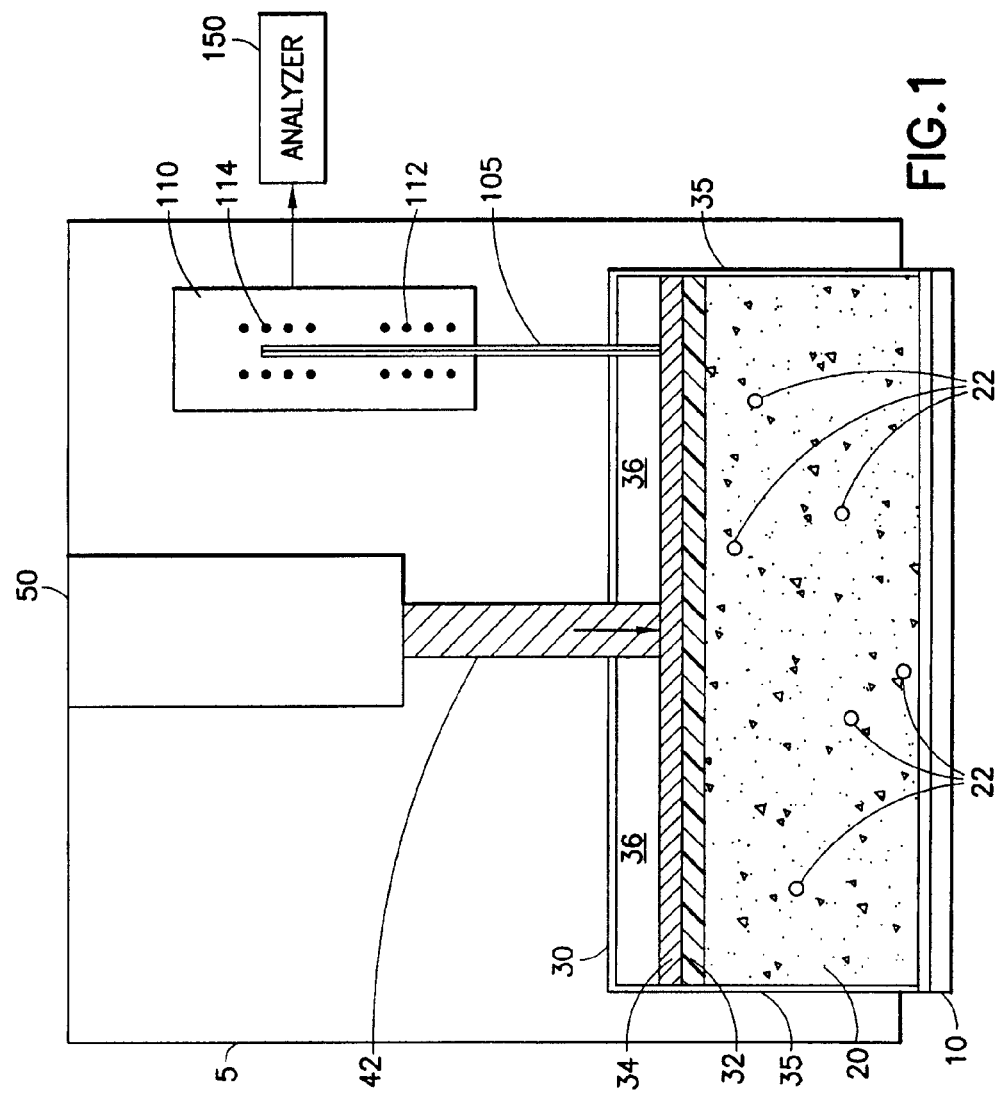
FIG. 1 shows in partially pictorial, partially schematic form a front view of an embodiment of the invention.

In order to carry out the purposes of the invention, a linear variable differential transformer (LVDT) may be attached to an extrusion screening nozzle piston, as shown in FIG. 1 below.

The large rectangle 5 represents schematically the instrument on which the paste dispensing system is mounted. It may include, for example, materials handling systems to place the workpiece, such as a carrier for an integrated circuit, in position to receive the paste.

Rectangle 50 represents schematically a conventional pressure source, such as compressed air or other gas that supplies pressure to piston shaft 42, which travels downwards in the figure as paste is dispensed.

Horizontal strip 34 represents the piston that applies the pressure from piston shaft 42 to the paste.

Strip 34 represents a Teflon™ seal that is in close mechanical contact with the walls 35 of the paste reservoir.

Walls 35 confine paste 20, shown as having a number of air bubbles 22 within it. Illustratively, paste 20 is a conductive paste that will, after heating, form conductors within a ceramic structure that conduct signals to various contacts on an integrated circuit.

At the bottom of the Figure, rectangle 10 represents the nozzle from which the paste flows to pass through apertures in a mask (not shown in the Figure). The apertures are located to deposit a pattern of paste that will, upon heating, form the conductors required by the particular design being fabricated.

In operation, the workpiece travels past the nozzle (or vice versa) and paste is dispensed at a rate that depends on the portion of the pattern underneath the nozzle at the particular time. The nozzle covers only a fraction of the workpiece and the rate of descent of the piston will therefore vary, depending on the density of the pattern underneath the nozzle.

On the upper right of rectangle 5, a vertical shaft 105 is the core of a conventional commercially available linear variable differential transformer. The shaft is rigidly mounted to the piston 34, so that the vertical position of core 105 depends directly on the vertical position of piston 34.

Rectangle 110 represents the differential transformer. It is shown with two coils 112 and 114. Core 105 passes all the way through the lower coil 112 and only partly through upper coil 114. The relative magnitude or amplification factor of the two coils will therefore produce a corresponding difference in output signals. For example, a common input is supplied through both coils 112 and 114. The difference in the outputs of the two coils will therefore represent the position of core 105.

Subtracting the signal from coil 112 from that from coil 114 will therefore produce a signal representing the position of core 105 and therefore of piston 34. In this Figure, transformer 110 is rigidly mounted to the paste dispenser by a conventional structure not shown.

On the right, analyzer 150 represents conventional electronics, whether custom or a general purpose computer, that applies analytical processes to the output signals as described below.

The LVDT provides constant feedback of piston position enabling real-time monitoring of piston movement during normal screening operation. Monitoring and analysis of the piston movement can enable the detection and correction of all of the potential screening problems outlined above.

Alternatively, the LVDT can be permanently mounted to the screening tool in mechanical communication with the nozzle piston actuator assembly, thereby simplifying the implementation into the manufacturing line.

Figure 2:
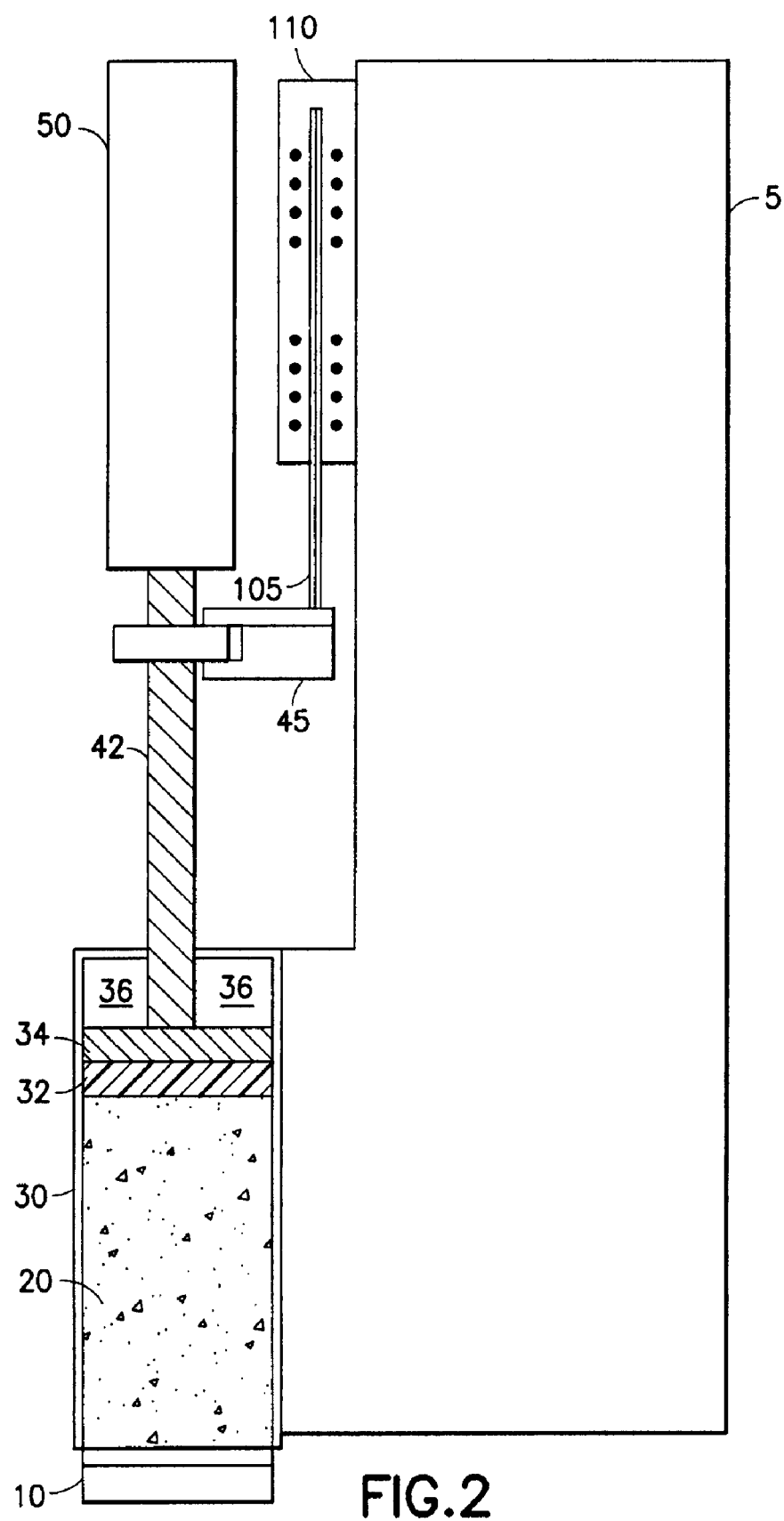
FIG. 2 shows in partially pictorial, partially schematic form a side view of an alternative embodiment of the invention.

FIG. 2 shows a side view of the structure, with the alternative mounting.

Screener 5 supports the paste dispenser 20 and the variable differential transformer 110. Pressure cylinder 50 is also supported, by conventional means not shown.

In this case, a clamping mechanism 45 clamps to piston shaft 42 and supports core 105.

FIG. 3 shows the output of the LVDT charted versus time for real-time paste usage data from normal manufacturing screening operation. Time is on the x-axis, piston displacement is on the y-axis. Note the sharp piston displacement at beginning and end of each screening stroke, indicative of compliance (entrapped air) in the system.

Three segments 320-1, 320-2 and 320-3 slant downward at the same slope, showing the change in piston position as the paste is dispensed.

At the end of each segment, the pressure in cylinder 50 is dropped, to stop the flow of paste. When that happens, the piston retracts or "springs back" as the entrapped air in the paste, released from the pressure of the piston, forces the piston upward.

The vertical height of the upward restoring deflection is a measure (referred to as the compression signal) of the amount of entrapped air in paste 20. Those skilled in the art will appreciate that the amount of entrapped air should generally be uniform through the paste and therefore that the amount of air will depend on the amount of paste remaining.

Analysis of the air will preferably comprise a measurement by conventional techniques of the magnitude of the piston retraction. A retraction above some limit indicates too much entrapped air and will trigger an alarm (and initiate corrective action).

Illustratively, the spring back may be tested with a full paste reservoir and with the nozzle closed at the start of a run. If desired, the spring back may be measured periodically during the run, with the alarm limit being adjusted in accordance with the remaining volume of paste. An amount of retraction that is acceptable with a full reservoir might indicate too much air when the reservoir is one quarter full.

FIGS. 4 and 5 show the results of closed nozzle pressurization tests. FIG. 4 shows results for a quarter-full nozzle. Note the deflection and subsequent recovery of piston position, denoted with bracket 410. In this test, normal pressure was applied to the piston 50 for two seconds and then released. Distance 410 represents an acceptable and rather low amount of entrapped air.

FIG. 5 shows similar results for a half-full nozzle. Note the increased deflection (bracket 510) compared to the quarter-full nozzle. The increased deflection, which is close to twice the deflection 410 is indicative of the same (acceptable) concentration distributed air bubbles in the paste. Increased deflection proportionate to increased reservoir volume.

An illustrative sequence for use of the invention is:

Install a fresh nozzle on the screener and conduct a trapped air test by applying pressure to cylinder 50 and releasing the pressure while measuring the spring back.

If the amount of entrapped air is acceptable, begin application screening while measuring the application rate (indicated by the slope of the piston displacement). If the application rate is too high or low, take corrective action.

The tested value of piston displacement rate for application of the criteria may be summed or integrated over time to smooth out fluctuations.

Also, fluctuations in the rate of displacement above a reference threshold may be flagged to indicate friction or stiction in the system. In the case of a stiction "hiccup", the LVDT output signal will be constant for the duration of the stiction (short compared with the duration of the dispensing period) and then quickly shift to the slanting line 320-i (similar in slope to the shifts 331 and 333). Such fluctuations may easily be detected by differentiating the piston displacement signal and testing if a spike exceeds a threshold for a time less than a spike time limit (an additional indication being that the differentiated signal will be substantially zero for the duration of the stiction). The spike time limit is used to discriminate between a short event, indicative of stiction or friction in the nozzle, and an excessive dispense rate for a time greater than a threshold time limit, indicative of an incorrect nozzle opening. There will be a normal spike in the derivative signal at the start and end of a segment 320 (in FIG. 3) when the entrapped air is compressed and released. That may handled by ignoring spikes within a certain time of the start and end of a stroke.

A linear variable differential transformer is the preferred unit to generate the output signals but other transducers that report piston displacement such as optical encoders, capacitive sensors, etc. may be used.

While the invention has been described in terms of a single preferred embodiment, those skilled in the art will recognize that the invention can be practiced in various versions within the spirit and scope of the following claims.

What is claimed is:

1. A system for monitoring the dispensing of a paste from a reservoir in response to the application of pressure on said paste from a piston, comprising:
   a position transducer for generating a displacement signal representative of the position of said piston; and
   analysis means responsive to said displacement signal for detecting the rate of displacement of said piston, in which said analysis means compares said rate of displacement with at least one reference rate and said analysis means detects whether said rate of displacement has exceeded said at least one reference rate for a time greater than a threshold time limit.

2. A system for monitoring the dispensing of a paste from a reservoir in response to the application of pressure on said paste from a piston, comprising:
   a position transducer for generating a displacement signal representative of the position of said piston; and
   analysis means responsive to said displacement signal for detecting the rate of displacement of said piston, in which said analysis means compares said rate of displacement with at least one reference rate and said analysis means detects whether said rate of displacement has exceeded said at least one reference rate for a time less than a spike time limit.

3. A system for monitoring the dispensing of a paste from a reservoir in response to the application of pressure on said paste from a piston, comprising:
   a position transducer for generating a displacement signal representative of the position of said piston; and
   analysis means responsive to said displacement signal for detecting the rate of displacement of said piston, in which said analysis means comprises a linear variable differential transformer having a core that translates in accordance with said piston.

4. A system according to claim 3, in which said analysis means compares said rate of displacement with at least one reference rate.

5. A system according to claim 4, in which said analysis means compares said rate of displacement with an upper reference rate limit and with a lower reference rate limit.

6. A system according to claim 4, in which said analysis means detects whether said rate of displacement has exceeded said at least one reference rate for a time greater than a threshold time limit.

7. A system according to claim 4, in which said analysis means detects whether said rate of displacement has exceeded said at least one reference rate for a time less than a spike time limit.

8. A system for monitoring the dispensing of a paste from a reservoir in response to the application of pressure on said paste from a piston, comprising:
   a position transducer for generating a displacement signal representative of the position of said piston; and
   analysis means responsive to said displacement signal for measuring a compression signal comprising the difference in said displacement signal when a reference pressure is applied and when said reference pressure is released.

9. A system according to claim 8, in which said input pressure signal is the termination of pressure at the end of an application sequence.

10. A system according to claim 8, in which said analysis means compares said compression signal with a constant reference.

11. A system according to claim 8, in which said analysis means compares said compression signal with a variable reference that varies in proportion to said position of said piston.

12. A system according to claim 8, further comprising means for applying an input pressure signal to said piston when flow of said paste is blocked and means for measuring a compression signal responsive to said input pressure signal.

13. A system according to claim 8, in which said analysis means comprises a linear variable differential transformer having a core that translates in accordance with said piston.

14. A system according to claim 13, in which said input pressure signal is the termination of pressure at the end of an application sequence.

15. A system according to claim 13, in which said analysis means compares said compression signal with a constant reference.

16. A system according to claim 8, further comprising means for applying an input pressure signal to said piston when flow of said paste is blocked and means for measuring a compression signal responsive to said input pressure signal.

17. A system according to claim 16, in which said input pressure signal is a square wave.

* * * * *